United States Patent [19]

Tsukahara et al.

[11] Patent Number: 4,965,060

[45] Date of Patent: Oct. 23, 1990

[54] PROCESS FOR PRODUCING HYDROGEN CYANIDE AND APPARTUS FOR USE IN THE PROCESS

[75] Inventors: Kengo Tsukahara; Takeshi Otake, both of Niigata; Masao Saito, Yachiyo; Toshio Koseki, Abiko, all of Japan

[73] Assignee: Mitsubishi Gas Chemical Company, Inc., Tokyo, Japan

[21] Appl. No.: 337,404

[22] Filed: Apr. 13, 1989

[30] Foreign Application Priority Data

Apr. 13, 1988 [JP] Japan .................................. 63-89305

[51] Int. Cl.$^5$ ................................................ C01C 3/02
[52] U.S. Cl. ............................. 423/376; 122/DIG. 13; 165/134.1; 422/202; 422/240
[58] Field of Search ................ 423/376; 422/202, 240; 122/DIG. 13; 165/905, 134.1

[56] References Cited

U.S. PATENT DOCUMENTS

| 3,056,655 | 10/1962 | Inman | 423/376 |
| 3,104,945 | 9/1963 | Jenks et al. | 423/376 |
| 3,215,495 | 11/1965 | Jenks et al. | 423/376 |
| 3,658,471 | 4/1972 | Sperka et al. | 423/376 |

FOREIGN PATENT DOCUMENTS

| 465368 | 5/1950 | Canada | 423/376 |
| 723508 | 2/1955 | United Kingdom | 423/376 |

Primary Examiner—Wayne A. Langel
Attorney, Agent, or Firm—Wenderoth, Lind & Ponack

[57] ABSTRACT

A process for producing hydrogen cyanide which comprises reacting methane or a gas containing methane as a main component, ammonia and an oxygen-containing gas in the presence of a platinum-containing catalyst, wherein the reaction gases are quenched by using an indirect heat-exchanger, preferably an indirect heat-exchanger made of a nickel alloy having an iron content of not more than 4.0% by weight, without quenching them directly with water.

3 Claims, No Drawings

PROCESS FOR PRODUCING HYDROGEN CYANIDE AND APPARTUS FOR USE IN THE PROCESS

BACKGROUND OF THE INVENTION

1. Field of the Invention

This invention relates to an improvement in a process for producing hydrogen cyanide which comprises reacting methane or a gas containing methane as a main component, ammonia and an oxygen-containing gas, and to an apparatus for use in the process.

2. Description of the Prior Art

Hydrogen cyanide has previously been used mainly as a material for methacrylic esters or for various organic syntheses, and recently as a material for the production of sodium cyanide which is used for metal refining. Its use in the production of pharmaceuticals such as biologically active substances has also increased.

Industrial production of hydrogen cyanide involves the decomposition of formamide or the ammoxidation of methane. Hydrogen cyanide is also produced as a by-product in the production of acrylonitrile by ammoxidation of propylene.

Production of hydrogen cyanide by ammoxidation of methane is described, for example, in Japanese Patent Publication No. 14128/1960. It is obtained by reacting a gas containing methane as a main component, such as natural gas, with a gaseous mixture of ammonia and air in the presence of a platinum-type catalyst at a temperature of as high as more than 1000° C. In order to prevent decomposition of hydrogen cyanide in the reaction gas in this reaction, the reaction gas at a high temperature should be quenched to below 700° C. within a short period of time, and it is the general practice to inject quenching water into a site just below the catalyst bed. This method of quenching the high-temperature gas is not desirable because a large amount of thermal energy derived from a temperature of about 1000° C. is lost.

U.S. Pat. No. 3,104,945 discloses a method of curtailing the consumption of energy in such a hydrogen cyanide producing apparatus. According to this method, the starting gas is pre-heated to 400° to 525° C. and then introduced into the reactor so that the conversions of methane and ammonia to hydrogen cyanide and the yield of hydrogen cyanide are increased.

I&EC PROCESS DESIGN AND DEVELOPMENT, Vol. 7, No. 1, pages 53–61 (1968) formulates the relation among the yield of hydrogen cyanide, the mole ratio of the starting materials, and the reaction temperature, and gives a flow chart showing that the reaction gas is directly cooled with quenching water and then cooled by using a heat-exchanger.

SUMMARY OF THE INVENTION

The present inventors studied the method of reducing the amount of energy used in the process of producing hydrogen cyanide by ammoxidation of methane, and found that (1) the recovery of the heat of the high-temperature gas by providing a heat-exchanger instead of injecting quenching water into a site immediately below the catalyst bed is very advantageous because it permits effective use of the thermal energy, and (2) in this process the high temperature gas containing hydrogen cyanide makes contact with a heat-transfer tube of the heat exchanger, and if the heat-transfer tube is made of an ordinary material, hydrogen cyanide undergoes decomposition and its yield is decreased, but if the heat-transfer tube is made of a nickel alloy containing not more than 4.0% by weight of iron, hydrogen cyanide scarcely undergoes decomposition and therefore its yield does not decrease. This finding has now led to the present invention.

The present invention provides a process for producing hydrogen cyanide which comprises reacting methane or a gas containing methane as a main component, ammonia and an oxygen-containing gas in the presence of a platinum-containing catalyst, wherein the reaction gases are quenched by using an indirect heat-exchanger without quenching them directly with water. In a preferred embodiment, a heat-transfer tube in the indirect heat-exchanger is made of a nickel alloy containing not more than 4.0% by weight of iron. There is also provided an apparatus for use in the above process.

DETAILED DESCRIPTION OF THE INVENTION

Generally, the reaction of synthesizing hydrogen cyanide by ammoxidation of methane is carried out by bringing a gaseous mixture composed of natural gas, ammonia and air or an oxygen-containing gas in which the methane/ammonia mole ratio is 1:1.2–1.4 and the oxygen/ammonia mole ratio is 1:1.2–1 into contact with a platinum-containing catalyst at a temperature of 1000° to 1200° C. and a pressure of from normal atmospheric pressure to not more than 3.0 kg/cm$^2$-G.

To prevent decomposition of hydrogen cyanide in the reaction gas, it is necessary to quench it to a temperature of not more than 700° C. The material for the heat-transfer tube of the heat exchanger used for this purpose is required to have good processability, high heat resistance, and a low content of substances having the property of decomposing hydrogen cyanide. Austenitic nickel alloys are generally chosen as a material having high heat resistance. As a material having higher heat resistance, a nickel alloy containing chromium is usually employed. Materials which further contain other metals such as molybdenum, manganese, niobium and tantalum may also be used.

To prevent decomposition of hydrogen cyanide, the material for the heat-transfer tube must have an iron content of as low as not more than 4.0% by weight. Preferably, the nickel alloy used as the material for the heat-transfer tube in this invention consists of (a) 60 to 80% by weight of nickel, (b) 5 to 25% by weight of chromium, (c) 0 to 3% by weight of iron, and (d) 0 to 25% by weight of the other metals mentioned above, the total amount of the constituents (a) to (d) being 100% by weight. In the apparatus used in this invention, the above proportions of nickel and chromium are preferred in practice because the nickel alloy used in this invention is required to have excellent high-temperature heat resistance, corrosion resistance, and processability for making the heat exchanger in addition to the property of preventing decomposition of hydrogen cyanide. Examples of the material for the heat-transfer tube which meet these requirements are Inconel 625 and Hastelloy W (Ni 69 wt %, Mo 23 wt %, Cr 5 wt %, Fe 3 wt %).

The characteristic feature of the process of this invention is that a gaseous mixture composed of methane, ammonia and air or an oxygen-containing gas is contacted with a platinum-containing catalyst, and then without quenching the gas with quenching water, the gas is quenched by an indirect heat exchanger and the heat of the reaction is effectively recovered. The recovered heat is utilized for generation of pressurized steam or for preheating the starting methane (natural gas), ammonia and air either singly or as a mixture. When it is utilized for preheating the starting gas to a high temperature, the amount of methane or ammonia burnt within the reactor can naturally be reduced, and the yield of hydrogen cyanide based on each of the starting gases can be increased markedly. Furthermore, since the amount of the gas introduced can be decreased, the reaction apparatus can be built in a small size. Hence, the process of this invention is very advantageous.

The yield of hydrogen cyanide is high because in the hydrogen cyanide producing apparatus of this invention, the decomposition of hydrogen cyanide is little. Furthermore, in accordance with this invention, the heat of the high-temperature reaction gas at 1000° C. or more can be directly recovered, and can be effectively utilized to preheat the starting gases in the hydrogen cyanide producing apparatus or to recover the pressurized steam. Consequently, the efficiency of the hydrogen cyanide producing apparatus can be increased, and the unit consumption of the starting materials and utility can be decreased. Accordingly, the present invention is of great industrial significance.

The following examples illustrate the present invention more specifically. It should be understood that the invention is not limited to these examples alone.

EXAMPLE 1

Test for decomposing hydrogen cyanide:

A quartz double tude having an inside diameter of 7 mm and a length of 775 mm was fitted to the inside of an electric oven. A sample of each of various nickel alloys was inserted into the double tube, and hydrogen cyanide decomposition was tested.

A feed gas of a nearly constant composition composed of about 5% of HCN, about 80% of $H_2O$ and about 15% of $N_2$ prepared by evaporating an aqueous solution of hydrogen cyanide with nitrogen in an evaporator was fed into a reaction tube, and subjected to a decomposition test at a linear velocity of 1.5 m/sec and a temperature of 1040° C. under atmospheric pressure.

The test results are shown in Table 1 below.

TABLE 1

| Test No. | Sample (wt. %) (*1) | | | Diameter of the sample (mm) | Hydrogen cyanide decomposition ratio (%) (*2) |
|---|---|---|---|---|---|
| | Fe | Ni | Cr | | |
| 1 | Blank | | | | 1.48 |
| 2 | 65–71 | 8–12 | 18–20 | 0.5 | 35.6 |
| 3 | 7.0 | 77 | 15.5 | 1.25 | 13.5 |

TABLE 1-continued

| Test No. | Sample (wt. %) (*1) | | | Diameter of the sample (mm) | Hydrogen cyanide decomposition ratio (%) (*2) |
|---|---|---|---|---|---|
| | Fe | Ni | Cr | | |
| 4 | 2.5 | 63 | 21.5 | 1.2 | 2.38 |
| 5 | 1.5> | 75–79 | 18–20 | 1.0 | 2.38 |
| 6 | 0.5 | 72 | 19 | 1.0 | 0.77 |

(*1): The samples used were as follows. The components put in the parentheses were contained in addition to Ni, Fe and Cr, and the underlined components were contained in an amount of at least 1.0%.
2. SUS304 (Mn, Si, C, S, P)
3. Inconel 600 (Mo, Si, C, S, P, Co)
4. Inconel 625 (Mn, Si, C, <u>Mo</u>, <u>Nb + Ta</u>, Al, Ti)
5. Ni—Cr wire (Mn, Si)
6. TIG82 (<u>Mn</u>, Si, C, Ti, S, <u>Nb + Ta</u>)
(*2): The hydrogen cyanide decomposition ratio is expressed by the following equation.

$$\text{HCN decomposition ratio (\%)} = \frac{FHCN - RHCN}{FHCN} \times 100$$

FHCN: Moles of HCN fed at the inlet of the reactor
RHCN: Moles of HCN remaining at the exit of the reactor

EXAMPLE 2

A gaseous mixture composed of ammonia, methane and air in a mixing ratio of 1:1.3:6:4 was introduced at a rate of 150 m³/hour into a reactor having an inside diameter of 250 mm in which platinum gauze was placed as a catalyst on an alumina perforated plate, and hydrogen cyanide synthesizing reaction was carried out at a temperature of 1050° to 1150° C. A heat-exchanger comprised of a heat-conducting tube made of Inconel 625 was set up just below the catalyst layer, and steam under a pressure of 15 kg/cm²-G was generated.

In this reactor, the yield of hydrogen cyanide in the initial stage was 81% (based on ammonia). After the initiation of the reaction, the reactor was operated continuously for 180 days. There was no decrease in the yield of hydrogen cyanide The inside of the reactor was inspected after stopping the operation, and no change was observed in the heat-conducting tube.

We claim:

1. A process for producing hydrogen cyanide which comprises reacting methane or a gas containing methane as a main component, ammonia and an oxygen-containing gas in the presence of a platinum-containing catalyst, wherein the reaction gases are quenched by using an indirect heat-exchanger without quenching them directly with water, said indirect heat exchanger being made of a nickel alloy which consists of
    (a) 60 to 80% by weight of nickel,
    (b) 5 to 25% by weight of chromium,
    (c) 0 to 3% by weight of iron, and
    (d) 0 to 25% by weight of another metal,
the total amount of the components (a), (b), (c) and (d) being 100% by weight.

2. The process of claim 1 in which methane or the gas containing methane as a main component, ammonia and the oxygen-containing gas are preheated either singly or as a mixture in the indirect heat-exchanger.

3. The process of claim 1 in which steam under pressure is generated in the indirect heat-exchanger.

* * * * *